Patented Dec. 17, 1929

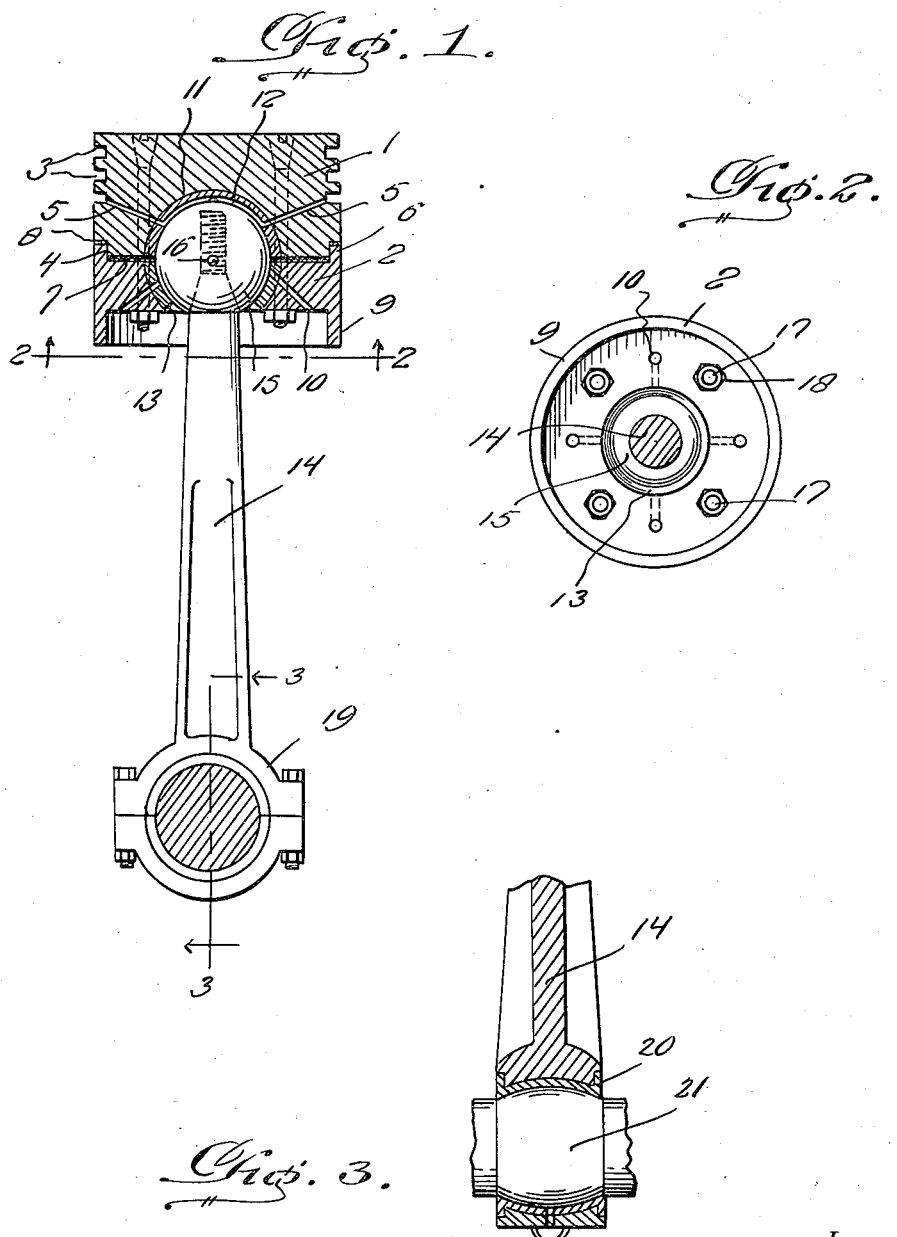

1,739,705

UNITED STATES PATENT OFFICE

CLAUDE E. BARNES AND JOHN A. JOHNSON, OF POTEAU, OKLAHOMA

CONNECTING ROD AND PISTON CONSTRUCTION

Application filed December 5, 1927. Serial No. 237,849.

Our invention relates to improvements in connecting rod and piston connections, the same relating more particularly to the type of connection wherein the upper end of the connecting rod is swivelled to the piston by a ball and socket connection.

Although this type of connection is known to be old, the present invention embodies certain improvements which will make the employment of these structures more practical.

The main object of our invention is to provide a novel connection between pistons and their respective connecting rods, wherein the co-related parts are easily and conveniently detachable, to make repairs or replacements.

Another object resides in means whereby the bearing enclosing the ball connection will always be maintained properly lubricated.

Other very novel objects and advantages of my improvement will become apparent as the same is better understood from the specification and claim to follow.

In the drawing:—

Figure 1 represents a vertical sectional view through the improved piston construction disclosing the manner in which the upper end of the connecting rod is associated therewith.

Fig. 2 is a bottom view of the piston, and is a section taken substantially on the line 2—2 of Fig. 1, and Fig. 3 represents a fragmentary view of the lower portion of the connecting rod disclosing the manner in which the same is associated with the crank shaft.

Now for a more detail description of my invention, we refer to the drawings, in which like numerals designate like parts. The piston construction of our invention, includes an upper section 1, and a lower section 2. The upper section is formed with the usual packing ring receiving grooves 3, while the bottom surface thereof is formed with a concave pocket.

The lower edge of the top section is channeled at 4, while the lower ring receiving groove has openings thereinto, one end of respective lubricating ducts, 5, extending radially an inclination from the concave pocket at the bottom side of the section.

The lower section of the piston is provided at its top with an upstanding circumferentially extending flange 6, adapted for disposition within the said channel 4, at the bottom edge of the upper section, when the two sections have been secured together. A packing gasket 7 is disposed between the bottom of the upper section and the top of the lower section, in a manner clearly shown in Fig. 1.

A packing ring 8 is also interposed between the top surface of the flange 6 and the shoulder, at the side of the upper section, formed by the channel 4. The bottom section is also provided with the skirt 9, while the central portion of the lower section is open. The upper end of this opening is substantially greater in diameter, than is the opening at the bottom end, while the wall surface therebetween is of arcuate shape in cross section.

Radially and downwardly extending lubricating ducts 10, extend from the bottom surface of the lower section to communicate with the opening through the arcuate wall. In Fig. 1 of the drawing, it will be seen that we have provided a semi-spherically shaped bearing 11 adapted to be received within the concave pocket at the bottom side of the piston. This bearing is hollow and of substantially hemispherical shape. The top of the inner surface of this bearing is formed with grooves 12, communicating with openings in registry with the lubricating ducts 5.

The opening of the lower section is provided with a bearing ring, which is of arcuate cross section. The upper edge of this ring 13, is of substantial equal diameter to the circumference of the edge of the upper bearing, and while the lower edge of the bearing ring is of lesser diameter. The bearing ring is also formed with openings in registry with the lubricating ducts 10, whereby oil will lubricate the inner surface of the ring.

In connecting the connecting rod 14 to the piston, the upper end of the rod is reduced, and threaded for threaded relation within the threaded bore of a ball 15. When in association with the piston, the ball is adapted to have its lower portion engaged against the inner surface of the bearing ring 13, while at the top surface is engaged against the concave interior of the semi-spherical bearing 11.

A set screw 16 is threaded through the ball for biting relation with the threaded end of the connecting rods. When the ball has thusly been positioned, the bolts 17 are inserted through the vertically alined openings in the respective piston sections, the lower ends of which are threaded to receive nuts 18 for securing the sections tightly together. The upper end of the vertical bores are countersunk to receive the tapering head portions of the bolt, whereby the top surface of the respective heads will be in flush relation with the top surface of the piston.

It is preferably in conjunction with my improved connection, to provide the usual two-part bearing 19, with its inner surface transversely arcuate in shape to receive the wear resisting lining 20. This lining is of the usual secured relation with the bearing, excepting that the inner surface of which is transversely arcuate to engage the transversely convex surface 21 on the crank shaft. This connection will prevent any longitudinal movement of the bearing on the crank shaft.

It will be thus seen that we have provided novel connection between the piston and connecting rod whereby the piston may revolve in the usual cylinder, thusly eliminating the irregular wear thereof. The manner in which the rod is connected with the piston, and the manner in which the crank shaft is associated with the connecting rod, will eliminate noise and prevent a great amount of negligible wear now occuring in these conventional connections.

Having thus described our invention, what we claim as new is:—

In a connecting rod and piston connection comprising a piston divided into an upper and a lower section, the upper section being formed with a circumferential channel at its lower edge portion, the lower section being provided with an upstanding circumferentially extending flange engageable within the channel for preventing disalinement in the sections, the upper section being provided with a socket, a semi-spherical shaped bearing body for disposition within said socket and having a groove at its inner side, the lower section being formed with an opening therethrough, a connecting rod for disposition through said opening, a ball secured to the upper end of said rod, the upper portion of said ball being adapted to engage within the semi-spherical shaped bearing, and a bearing ring for disposition within the opening of the lower section, said ring being of a curvature in cross section to conform with the peripheral curvature of the ball, and means for securing the sections together, said upper section being provided with a duct extending inwardly from the outer side of the same to communicate with said groove on the upper bearing structure.

In testimony whereof we affix our signatures.

CLAUDE E. BARNES.
JOHN A. JOHNSON.